United States Patent
Jun et al.

(10) Patent No.: US 7,072,425 B2
(45) Date of Patent: *Jul. 4, 2006

(54) DIGITAL TV RECEIVER

(75) Inventors: Jung Sig Jun, Seongnam-si (KR); Tok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/773,041

(22) Filed: Feb. 4, 2004

(65) Prior Publication Data

US 2004/0161056 A1    Aug. 19, 2004

(30) Foreign Application Priority Data

Feb. 4, 2003    (KR) ...................... 10-2003-0006734

(51) Int. Cl.
*H04L 27/22* (2006.01)

(52) U.S. Cl. .................................... 375/326

(58) Field of Classification Search ............... 375/326, 375/316, 321, 350, 261, 340, 270; 348/325, 348/725, 726; 329/304, 306, 307, 308, 357
See application file for complete search history.

(56) References Cited

U.S. PATENT DOCUMENTS

| | | | | |
|---|---|---|---|---|
| 5,673,293 A | * | 9/1997 | Scarpa et al. | ............... 375/321 |
| 5,872,815 A | * | 2/1999 | Strolle et al. | ............... 375/321 |
| 6,160,443 A | * | 12/2000 | Maalej et al. | ............... 329/304 |
| 6,862,325 B1 | * | 3/2005 | Gay-Bellile et al. | ........ 375/340 |

* cited by examiner

*Primary Examiner*—Robert J. Pascal
*Assistant Examiner*—Krista Flanagan
(74) *Attorney, Agent, or Firm*—Lee, Hong, Degerman, Kang & Schmadeka

(57) ABSTRACT

A digital TV receiver includes an A/D converter converting an analog signal into a digital signal, a carrier recovery converting the digital pass-band signal into a digital base-band signal, and a symbol clock recovery converting digital real/imaginary base-band component signals into OQAM type of real/imaginary component signals, detecting timing error information by performing high pass-band filtering on the OQAM real/imaginary signals, and squaring and adding the filtered value, and for generating and outputting at least two times the frequency of the symbol clock corrected from the detected timing error information.

13 Claims, 3 Drawing Sheets

DIGITAL TV RECEIVER

CROSS-REFERENCE TO RELATED APPLICATIONS

This application claims the benefit of Korean Application No. P2003-06734, filed on Feb. 4, 2003, which is hereby incorporated by reference as if fully set forth herein.

BACKGROUND OF THE INVENTION

1. Field of the Invention

The present invention relates to a digital TV receiver, and more particularly, to a digital TV receiver for recovering a symbol clock from received data.

2. Discussion of the Related Art

An advanced television systems committee (ATSC) 8 VSB (Vestigial Side Band) transmission system proposed by most current digital transmission systems and a US directed digital TV transmission mode loads data only in a transmission signal to increase an effect of a frequency. That is, clock information needed for data recovery at a receiving party is not transmitted. Therefore, the same clock as that employed during the transmission should be generated among the received signals having only data to recover the data at the receiving party. A symbol clock recovery performs the role.

The carrier recovery performs the carrier recovery by detecting a pilot signal included in the transmitting signal. If the carrier recovery includes FPLL (Frequency Phase Locked Loop), the FPLL simultaneously performs a FLL (Frequency Locked Loop) process and a PLL (Phase Locked Loop) process, the FLL process removing frequency difference between the carrier component of the receiving signal and standard carrier component of the receiver itself, and a PLL process removing phase difference of the two carrier signals from which the frequency difference is removed.

In this case, if the carrier recovery and symbol clock recovery are coupled in order, the symbol clock recovery is not totally removed from the carrier recovery and is influenced by a remained frequency and phase error flowed in because efficiency of the carrier recovery largely influences on efficiency of the symbol clock recovery, and that gives bad influence on the total performance of the symbol clock recovery. That is, when the carrier recovery is not completely performed at the carrier recovery member, the frequency and phase error differences between the carrier signal and the standard carrier signal are outputted to the symbol clock recovery, the carrier signal employed by the receiver. Therefore, the symbol clock recovery carries out symbol clock recovery from the signal, and it is difficult to normally recover the symbol clock.

The reason why the symbol clock recovery is located at an end of the general carrier recovery is that the symbol clock recovery is designed under an assumption that the role of the carrier recovery is completed. Therefore, if the carrier recovery is not completely performed, the symbol clock recovery is not performed as well.

SUMMARY OF THE INVENTION

Accordingly, the present invention is directed to a digital TV receiver that substantially obviates one or more problems due to limitations and disadvantages of the related art.

An object of the present invention is to provide a digital TV receiver for recovering a symbol clock without being interfered by a phase error of remained phase wave in the carrier recovery.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital TV receiver includes an A/D (Analog/Digital) converter for converting an analog signal into a digital signal, a carrier recovery for converting the digital pass-band signal into a digital base-band signal, and a symbol clock recovery for converting digital real/imaginary base-band component signals into OQAM (Offset Quadrature Amplitude Modulation) type of real/imaginary component signals, detecting timing error information by performing a high pass-band filtering on the OQAM real/imaginary signals, and squaring and adding the filtered signals, and for generating and outputting at least two times the frequency of the symbol clock corrected from the detected timing error information.

In this case, the symbol clock recovery includes an OQAM converter converting each of the digital base-band real/imaginary signals interpolated and outputted from the resampler into OQAM real/imaginary component signals; a high pass filter performing a high pass-band filtering on the OQAM real/imaginary component signals outputted from the OQAM converter for removing information of data section; a squarer squaring each of the OQAM real/imaginary component signals filtered by and outputted from the high pass-band filter, and adding and outputting the calculation; a pre-filter passing only a frequency of a predetermined band from the output of the squarer for recovering the symbol clock; a timing error detector detecting timing error information from the output of the pre-filter; a filtering member filtering only a low pass-band signal from the timing error information outputted from the timing error detector; and an NCO(Numerically Controlled Oscillator) generating at least two times the frequency of the symbol clock interpolated according to low pass-band components of the filtered timing error information and outputting to the resampler.

The OQAM converter multiplies digital base-band real/imaginary component signals interpolated and outputted from the resampler by a fixed frequency with a center frequency of 2.690559 MHz for converting digital base-band real/imaginary component signals into the OQAM real/imaginary component signals.

The symbol clock recovery includes an OQAM converter converting each of the digital base-band real/imaginary signals outputted from the carrier recovery into OQAM real/imaginary component signals; a high pass filter performing a high pass-band filtering on the OQAM real/imaginary component signals outputted from the OQAM converter for removing information of data section; a first squaring operator squaring each of the OQAM real/imaginary component signals filtered by and outputted from the high pass filter, and calculating difference of the two squared signals and squaring the calculation; a second squaring operator squaring each of the OQAM real/imaginary component signals filtered by and outputted from the high pass filter, and calculating and squaring a difference of the two squared signals; an adder adding the output of the first and second squaring operators; a pre-filter passing only a frequency of a predetermined band for recovering the symbol clock from the output of the adder; a timing error detector detecting timing error information from the output of the pre-filter; a filtering member filtering only the low pass-band signal from the timing error information outputted from the timing error detector; and an NCO for generating at least two times the frequency of the symbol clock recovered according to low pass-band signals of the filtered timing error information and outputting to the resampler.

In another aspect of the present invention, the digital TV receiver includes an A/D converter converting an analog signal into a digital signal; a carrier recovery converting the digital pass-band signal into a digital base-band signal; a resampler resampling digital base-band real/imaginary component signals outputted from the carrier recovery to at least two times the frequency of the symbol clock and interpolating each of the signals; an OQAM converter converting each of the digital base-band real/imaginary signals interpolated and outputted from the resampler into OQAM real/imaginary component signals; a high pass filter performing a high pass-band filtering on the OQAM real/imaginary component signals outputted from the OQAM converter for removing information of data section; a first squaring operator squaring each of the OQAM real/imaginary component signals filtered by and outputted from the high pass filter, and calculating difference of the two squared signals and squaring the calculation; a second squaring operator squaring each of the OQAM real/imaginary component signals filtered by and outputted from the high pass filter, and calculating and squaring a difference of the two squared signals; an adder adding the output of the first and second squaring operators; a pre-filter passing only a frequency of a predetermined band for recovering the symbol clock from the output of the adder; a timing error detector detecting timing error information from the output of the pre-filter; a filtering member filtering only the low pass-band signal from the timing error information outputted from the timing error detector; and an NCO for generating at least two times the frequency of the symbol clock recovered according to low pass-band signals of the filtered timing error information and outputting to the resampler.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention intended to exactly perform symbol clock recovery even when there is a heavy noise resulted from a multi-passage on a transmitting channel by reducing frequency signal around information employed by the symbol clock recovery and increasing fs/2 frequency retrieving timing information.

Figure 1:
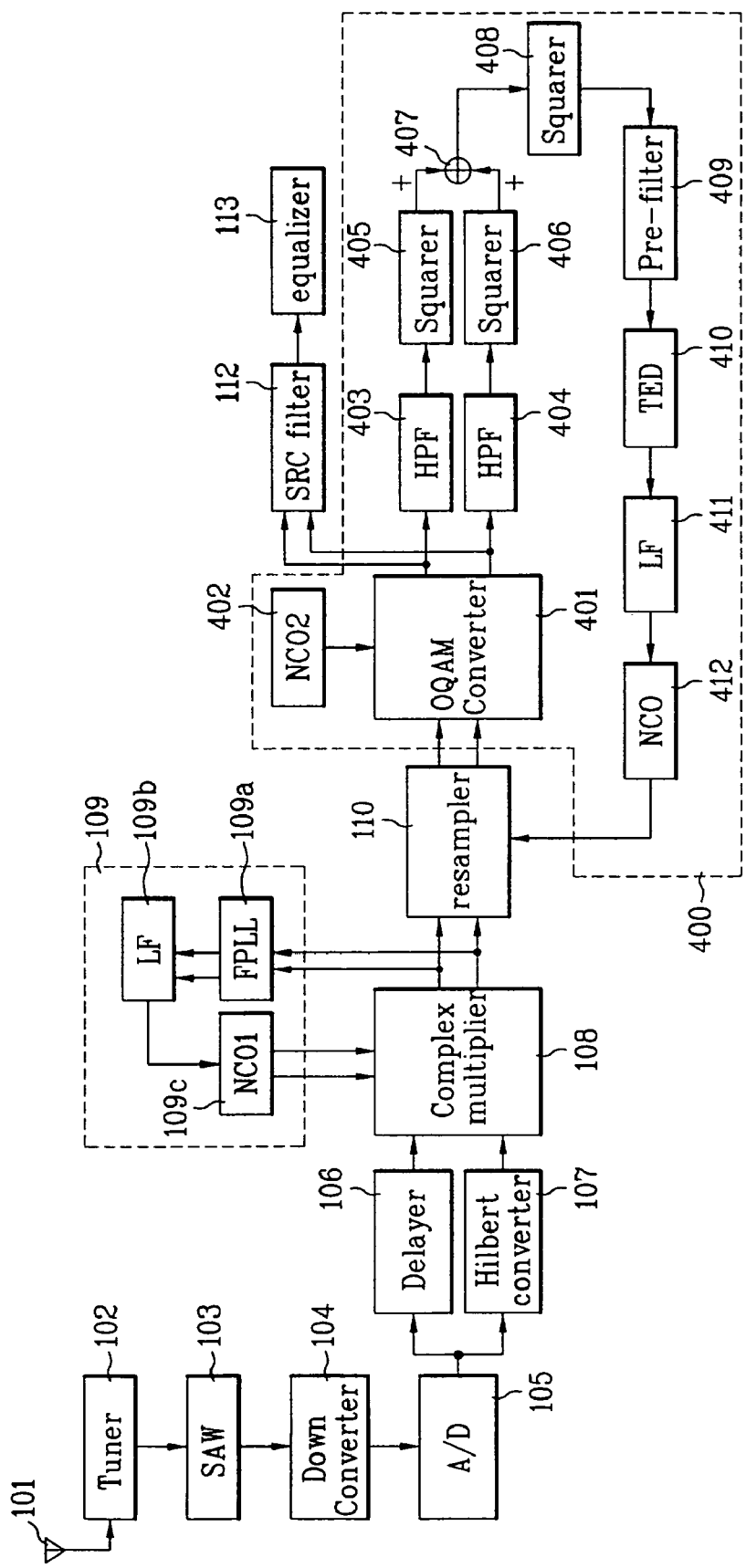
FIG. 1 illustrates a block diagram showing a digital TV receiver in accordance with a first embodiment of the present invention.

FIG. 1 is a block diagram showing a digital TV receiver in accordance with a first embodiment of the present invention. When RF (Radio Frequency) signal converted into a VSB type is received through an antenna 101, a tuner 102 selects a predetermined channel frequency, taking down the VSB signal in RF pass-band loaded on the channel frequency and filters other signals.

An output signal of the tuner 102 taking down the spectrum in the predetermined channel to a first IF pass-band passes through a SAW (Surface Acoustic Wave) filter employed for removing a high frequency component and noise signal generated from the tuner 102.

In this case, a digital broadcasting signal, for example, is outputted to a down converter 104 removing all parts except 6 MHz pass-band having information from an output of the tuner 102 in the SAW filter because all information exists from a middle frequency of 44 MHz to a pass-band of 6 MHz. The down converter 104 performs a down conversion to the signal filtered at the SAW filter 103 into a oscillating frequency for generating a second IF signal so as to convert the signal into a second IF signal and output to a analog/digital converter 105.

The A/D converter 105 samples the analog output of the down converter 104 to a fixed frequency, i.e., to a predetermined clock of 25 MHz so as to output the output to a delayer 106 and a Hilbert converter 107. In other words, although data sampled at 21.52 MHz, that is two times the frequency of the symbol clock frequency is transmitted at the receiving party, data outputted from the A/D converter 105 is a digital data sampled at 25 MHz.

In the case, the Hilbert converter 107 converts an input real component signal at 90° and converts the signal into an imaginary component signal so as to output the signal to a complex multiplier. The delayer 106 delays the input real component signal for a period of processing time of the Hilbert converter 107 and outputs the signal to the multiplier 108.

For an easier description, the signal passed through the delayer 106 is called I channel signal and the signal passed through the Hilbert converter is called Q channel signal.

The complex multiplier 108 receives a feedback of the carrier of which carrier recovery is completed at the carrier recovery 109, demodulates the I and Q pass-band signals outputted from the delayer 106 and the Hilbert converter 107, changes the I and Q pass-band signals to bass-band signals, and outputs the I and Q base-band signals to a resampler 110 for changing the signal to signals of which the symbol is recovered.

In this case, the carrier recovery 109 includes a FPLL (Frequency Phase Locked Loop) 109a, a Loop filter 109b, and an NCO 109c. The complex multiplier 108 is included to the carrier recovery.

Meanwhile, the resampler 110 basically performs a role of changing a sampling rate. That is, the data sampled at 21.52 MHz and received is sampled at 25 MHz in the A/D converter 105 and outputted. The resampler 110 resamples the data to 21 MHz and output the data.

For this, the resampler 110 interpolates the digital base-band signal outputted from the A/D converter 105 and the complex multiplier 108 to two times the frequency of the symbol clock frequency (i.e., 21.52 MHz) and outputs the signal.

The output of the resampler 110 is passed through the SRC (Square Root Raised Cosine) filter 112 and outputted to an equalizer 113 for recovering the real data.

The symbol clock recovery 400 includes an OQAM converter 401 multiplying the VSB real/imaginary component signals outputted from the resampler 110 by the oscillating frequency of an NCO2 402 with a center frequency of 2.690559 MHz for changing the signals into OQAM (Offset QAM) transmitting type of real/imaginary signals, a first high pass filter 403 performing a high pass filtering on the OQAM real/imaginary signals, a first squarer 405 squaring the OQAM real signal filtered at the first high pass filter 403, a second high pass filter 404 performing the high pass filtering on the OQAM real/imaginary signals, a second squarer 406 for squaring the OQAM imaginary signal filtered by the second high pass filter 404, an adder 407 for adding outputs of the first and second squarers 405 and 406, a squarer 408 for squaring an output of the adder 407, a pre-filter 409 for passing only an edge portion of the output spectrum of the squarer 408, a timing error detector 410 for detecting timing error information form the signal passed through the squarer 408, a loop filter 411 for filtering only low pass-band signal component from the timing error information, and an NCO 412 generating two times the frequency of the symbol clock frequency interpolated in accordance with the low pass-band component of the timing error information for controlling the sampling timing of the resampler 110. In this case, the first and second squarers 405 and 406, and the adder 407 are called a squaring operator.

The symbol clock recovery 400 composed as aforementioned calculates a timing error of the symbols, generates two times the frequency of the symbol clock frequency interpolated by the timing error, and outputs the frequency to the resampler 110.

In other words, the OQAM converter 401 of the symbol clock recovery 400 multiplies the VSB base-band real/imaginary signal resampled at 21.52 MHz and outputted by the oscillating frequency of the NCO2 402 having the center frequency of 2.690559 MHz, converts the signal into OQAM real/imaginary signals, and outputs the signals to the first and second high pass filters 403 and 404.

In this case, the signal passed through the carrier recovery 109 is called demod(t) and is described as a following mathematical formula 1.

$$\text{demod}(t) = (i(t)\cos\phi + q(t)\sin\phi) + j(-i(t)\sin\phi + q(t)\cos\phi) \quad \text{[Formula 1]}$$

In this case, φ is a phase offset not completely removed at the carrier recovery 109. The OQAM converter 401 multiplies the base-band signal as the mathematical formula 1 by the oscillating frequency of the NCO2 402 having the center frequency of 2.690559 MHz and converts the VSB base-band signal into OQAM signal.

In this case, the output signal OQ (t) of the OQAM converter 401 is described as a following formula 2.

$$OQ(t) = [(i(t)\cos\phi + q(t)\sin\phi) + j(-i(t)\sin\phi + q(t)\cos\phi)] xx [\cos(w_1 t) + j\sin(w_1 t)] \quad \text{[Formula 2]}$$

In this case, $w_1$ is a center frequency for generating OQAM signal. If the formula 2 is divided into the real component and imaginary component, each component is described as a following mathematical formula 3.

$$\text{real }(t) = i(t)\cos\alpha + q(t)\sin\alpha$$

$$\text{imag }(t) = -i(t)\sin\alpha + q(t)\cos\alpha \quad \text{[Formula 3]}$$

In this case, $\alpha = \phi - w_1 t$.

The first and second high pass filters 403 and 404 perform a high pass-band filtering on the OQAM real/imaginary signals, removes information of a data section from the OQAM real/imaginary signals, and outputs the signals to the first and second squarers 405 and 406, thereby only the band edge portion is remained in the OQAM I and Q signals filtered at the first and second high pass filters. 403 and 404.

Figure 2:
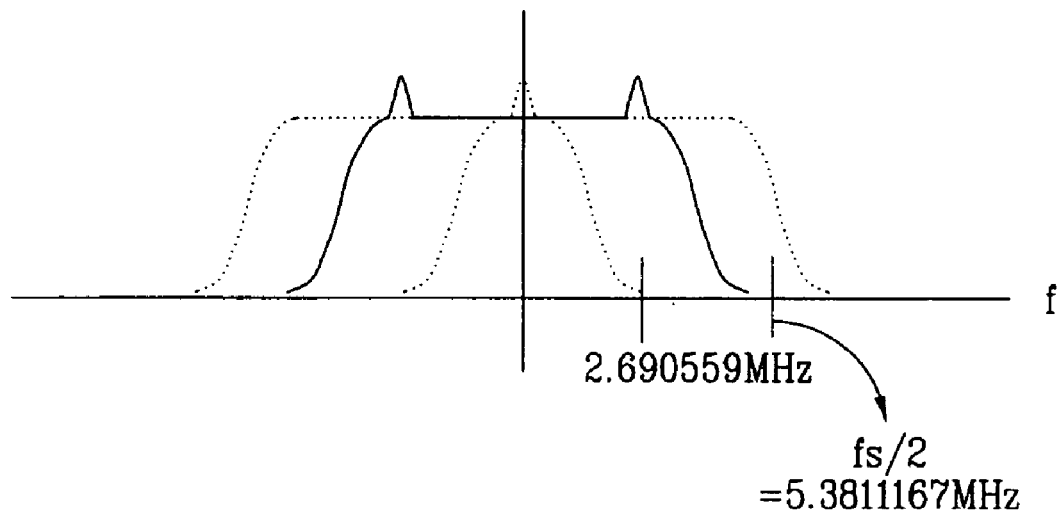
FIG. 2 illustrates a spectrum showing a signal convert for generating OQAM signal.
Figure 3:
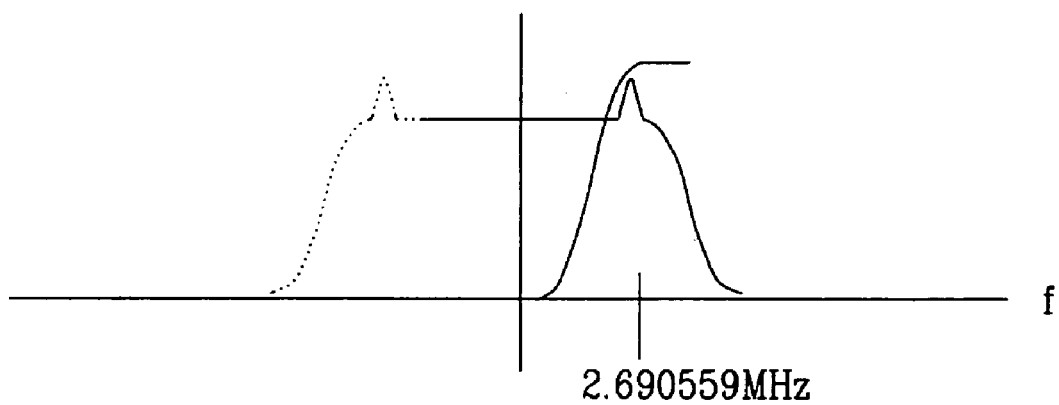
FIG. 3 illustrates a spectrum showing a frequency characteristic of a high pass filter.

FIG. 2 illustrates a spectrum showing a process of converting the VSB base-band real/imaginary signals into the OQAM real/imaginary signals. FIG. 3 illustrates a frequency spectrum showing a filter characteristic of the first and second high pass filters 403 and 404, and a result of the filtering.

As illustrated in FIG. 3, a spectrum of the first and second high pass filters 403 and 404 maintains roll-off component of the original SRC(Square root cosine) filter of the OQAM signal at an edge so as to maintain the edge characteristic needed for the symbol clock recovery.

The first squarer 405 squares the OQAM real signal filtered at the first high pass filter 403 and outputs the signal to the adder 407, the second squarer 406 squares the OQAM imaginary signal filtered at the second high pass filter 404 and outputs the signal to the adder 407, and the adder 407 adds two squared signals and outputs the calculation to the squarer 408.

In this case, the OQAM real/imaginary signals are passed through the squarers 405 and 406 such that the signal component of 2.690559 MHz is changed to 5.381118 MHz on the spectrum. The signal formed at 5.381118 MHz on the spectrum includes useful information to be used for the symbol clock recovery.

The SRC characteristic is maintained by the high pass filters 403 and 404 as aforementioned, and the edge characteristic of the signal may be used the same for the symbol clock recovery. Data component except the band edge component employed for the symbol clock recovery is removed at the high pass filters 403 and 404 such that it is advantageous that the jitter characteristic is enhanced.

In this case, the signal passed through the first and second squarers 405 and 406 is described as a following mathematical formula for a convenience in deploying the signals in formula.

$$\text{real}^2(t) = i^2(t)\cos^2(\alpha) + q^2\sin^2(\alpha) + 2i(t)q(t)\sin(\alpha)\cos(\alpha)$$

$$\text{imag}^2(t) = i^2(t)\sin^2(\alpha) + q^2\cos^2(\alpha) - 2i(t)q(t)\sin(\alpha)\cos(\alpha) \quad \text{[Formula 4]}$$

The output of the adder 407 added the outputs of the two squarers 405 and 406 as the mathematical formula 4 is described as a following mathematical formula 5.

$$\text{real}^2(t) + \text{imag}^2(t) = i^2(t)\{\cos^2(\alpha) + \sin^2(\alpha)\} + q^2(t)\{\cos^2(\alpha) + \sin^2(\alpha)\} \quad \text{[Formula 5]}$$
$$= i^2(t) + q^2(t)$$

As described in mathematical formula 5, the signal passed the OQAM converter 401 and the high pass filter (HPF)s 403 and 404 for generating OQAM signal, the squarers 405 and 406, and the adder 407 equals to a calculation resulted from squaring the real/imaginary components of demod(t) of the mathematical formula 1 and adding the squared values. In other words, a process passing through the OQAM converter 401, the HPFs 403 and 404, the squarers 405 and 406, and the adder 407 is a signaling process for the symbol clock recovery.

As aforementioned in the present invention, self-noise generated by data is reduced, and the jitter in the symbol clock recovery system is reduced by performing the high pass filtering on the signal passed through the OQAM converter 401 at the HPFs 403 and 404.

Since only a desired pass-band signal is remained by the HPFs 403 and 404, power of the desired pass-band signal is intensified from squaring the signal at the squarers 405 and 406.

When the band edge component of the OQAM signal is damaged because there is a heavy noise (ghost) by the multi-passage on the transmitting channel, the information needed for the symbol clock recovery may not be obtained. The performance of the symbol clock recovery is decreased because the signal passed through the HPFs 403 and 404, the squarers 405 and 406 has a relatively little power when there is a heavy noised (ghost) by the multi-passage on the transmitting channel.

Therefore, to solve this problem in the present invention, the added calculation of the adder 407 is outputted to the squarer 408 so as to be squared, and outputted to the pre-filter 409.

In other words, in an environment that the ghost exists, the information needed for the symbol clock recovery is more stably obtained by intensifying the power of the fs/2 frequency pass-band signal component.

The output of the squarer 408 resulted from squaring the output of the adder 407 is described as a following mathematical formula 6.

$$\{real^2(t)+imag^2(t)\}^2 = \{i^2(t)+q^2(t)\}^2 \quad [\text{Formula 6}]$$

As described in the mathematical formula 6, the output of the squarer 408 having an increased fs/2 frequency pass-band signal component is inputted to the pre-filter 409.

The pre-filter 409 passes only the edge portion of the spectrum for obtaining the timing error information from the signal outputted from the squarer 408 and outputs the signal to the phase error detector 410.

The phase error detector 410 multiplies the difference of the two symbol samples adjacent to each other by one middle sample value so as to obtain timing error information and output to the loop filter 411. The loop filter 411 filters only low pass-band signal component from the timing error information extracted from the Gardner phase error detector 410 and outputs the signal to the NCO 412. The NCO 412 generates off-set information needed for resampling the data sampled at 25 MHz to 21.524476 MHz in accordance with the filtered timing error information, and outputs the signal to the resampler 110.

Figure 4:
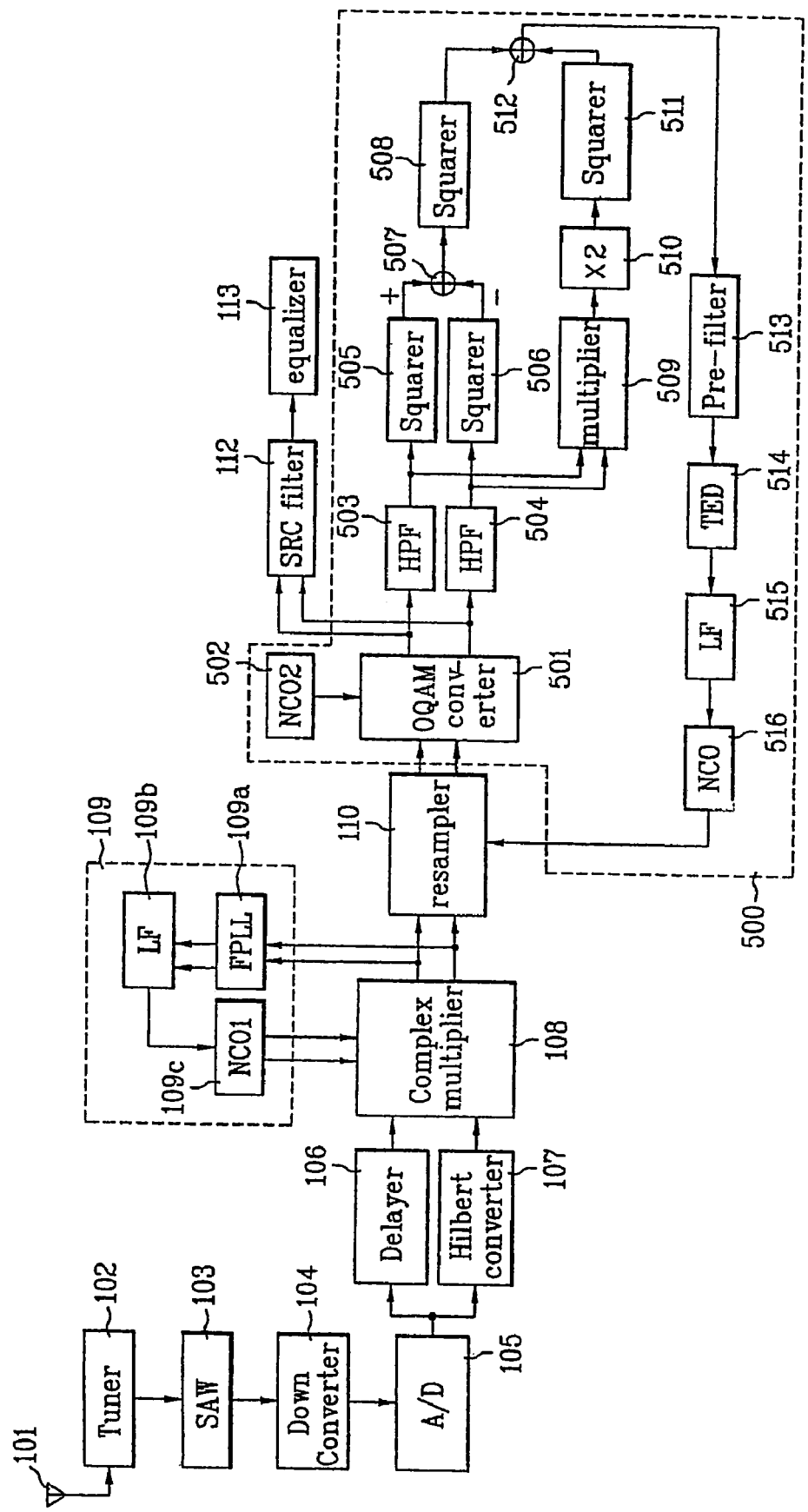
FIG. 4 illustrates a block diagram showing a digital TV receiver in accordance with a second embodiment of the present invention.

FIG. 4 illustrates a block diagram of the symbol clock recovery 500 in accordance with the second embodiment of the present invention. The symbol clock recovery includes an OQAM converter 501 multiplying the VSB type of real/imaginary component signals by an oscillating frequency of an NCO2 502 having a center frequency of 2.690559 MHz and converting the signals into OQAM (Offset QAM) type of real/imaginary signals, a first high pass filter 503 for performing the high pass-band filtering on the OQAM real signal, a first squarer 505 squaring the OQAM real signal filtered at the first high pass filter 503, a second high pass filter 504 performing the high pass filtering on the OQAM imaginary signal, a second squarer 506 squaring the OQAM imaginary signal filtered at the second high pass filter 504, a subtracter 507 outputting difference between the two squared signals outputted from the first and second squarers 505 and 506, a third squarer 508 squaring output of the subtracter 507, a multiplier 509 multiplying the OQAM real signal and the OQAM imaginary signal filtered by the first and second high pass filters 503 and 504, a gain controller 510 controlling gain of the multiplier 509, a fourth squarer 511 squaring the output of the gain controller 510, an adder 512 adding the outputs of the third and fourth squarers 508 and 511, a pre-filter 513 passing only the edge portion of the output spectrum of the adder 512, a timing error detector 514 detecting the timing error information from the signal passed through the pre-filter 513, a loop filter 515 filtering only low pass-band signal component from the timing error information outputted from the timing error detector 514, and an NCO 516 generating two times the frequency of the symbol clock frequency interpolated in accordance with the low pass-band component of the timing error information.

In this case, the first and second squarers 505 and 506, and the subtracter 507 are called a squaring operator. The multiplier 509, the gain controller 510, and the forth squarer 511 are called a multiplying operator.

The second embodiment of the present invention further comprises the multiplier 509, the gain controller 510, the forth squarer 511, and the adder 512. The outputs of the first and second squarers 505 and 506 are the same as the first embodiment except that the output is inputted to the subtracter 507.

In other words, the OQAM converter 501 multiplying the VSB base-band real/imaginary signals resampled at 21.52 MHz at the resampler 110 and outputted from the resampler 110 by the oscillating frequency of an NCO2 502 with the center frequency of 2.690559 MHz for changing the VSB base-band real/imaginary signals into OQAM real/imaginary signals, and outputted to the first and second high pass filters 503 and 504.

The first and second high pass filters 503 and 504 perform the high pass-band filtering on each of the OQAM real/imaginary signals, removes data section information from the OQAM real/imaginary signals, and output the signals to each of the first and second squarers 505 and 506. Therefore, only the band edge portion is remained in the OQAM I and Q signals filtered at the first and second high pass filters 503 and 504.

The first squarer 505 squares the OQAM real signal filtered at the first high pass filter 503 and outputs to the subtracter 507. The second squarer 506 squares the OQAM imaginary signal and outputs the calculation to the subtracter 507. The subtractor 507 outputs the difference of the two squared signals to the third squarer 508 thereby squared and outputted to the adder 512.

In other words, while the OQAM real/imaginary signals pass through each of the squares 505 and 506, 2.690559 MHz component is moved to 5.381118 MHz. The signal formed at 5.381118 MHz in the spectrum includes useful information for the symbol clock recovery. In this instance, the output signal of the subtractor 507 is described as a following formula.

$$real^2(t)-imag^2(t)=\{i^2(t)-q^2(t)\}\{\cos^2(\alpha)+\sin^2(\alpha)\}+4i(t)q(t)\sin(\alpha)\cos(\alpha) \quad [\text{Formula 7}]$$

If the output of the subtractor 507 as the mathematical formula 7 is squared in the third squarer 508, the value is described as a following mathematical formula 8.

$$\{\text{real}^2(t) - \text{imag}^2(t)\}^2 = \{i^2(t) - q^2(t)\}^2 \quad \text{[Formula 8]}$$
$$\{\cos^2(\alpha) + \sin^2(\alpha)\}^2 +$$
$$16i^2(t)q^2(t)\cos^2(\alpha)\sin^2(\alpha) +$$
$$8i(t)q(t)\cos(\alpha)\sin(\alpha)$$
$$\{i^2(t) - q^2(t)\}$$
$$\{\cos^2(\alpha) + \sin^2(\alpha)\}$$

Meanwhile, the multiplier 509 multiplies the OQAM real/imaginary signals filtered at the high pass filters 503 and 504 and outputs to the gain controller 510. The gain controller 510 multiplies the output of the multiplier 509 by 2 and outputs to the fourth squarer 511. The fourth squarer 511 squares the output of the gain controller 510 and outputs to the adder 512. The adder 512 adds the output of the third squarer 508 and the output of the fourth squarer 511 and outputs to the pre-filter 513. In this case, the output of the multiplier 509 multiplying the OQAM real/imaginary signals filtered at the high pass filters 503 and 504 is described as a following mathematical formula.

$$\text{real}(t) \times \text{imag}(t) = -\{i^2(t) - q^2(t)\}\sin(\alpha)\cos(\alpha) + i(t)q(t)\{\cos^2(\alpha) - \sin^2(\alpha)\} \quad \text{[Formula 9]}$$

A result of multiplying the mathematical formula 9 by 2 of the gain controller 510 and squaring the calculation at the fourth squarer 511 is described as a following mathematical formula 10.

$$2\{\text{real}(t) \times \text{imag}(t)\}^2 = 2\{i^2(t) - q^2(t)\}^2\cos^2(\alpha)\sin^2(\alpha) + \quad \text{[Formula 10]}$$
$$2i^2(t)q^2(t)\{\cos^2(\alpha) - \sin^2(\alpha)\}^2 +$$
$$4i(t)q(t)\{i^2(t)q^2(t)\}\{\cos(\alpha)\sin(\alpha)\}$$
$$\{\cos^2(\alpha) - \sin^2(\alpha)\}$$

The output of the third squarer 508 as the mathematical formula 8 is added to the output of the fourth squarer 511 at the adder 512 as the mathematical formula 9, and described as a following formula 11.

$$\{\text{real}^2(t) - \text{imag}^2(t)\}^2 + 2\{\text{real}(t) \times \text{imag}(t)\}^2 = \{i^2(t) + q^2(t)\}^2[\{\cos^2(\alpha) - \sin^2(\alpha)\}^2 + 2\cos^2(\alpha)\sin^2(\alpha)]$$
$$= \{i^2(t) + q^2(t)\}^2\{\cos^2(\alpha) + \sin^2(\alpha)\}^2 = \{i^2(t) + q^2(t)\}^2 \quad \text{[Formula 11]}$$

As described in formula 11, the result may be the same as the output of the squarer 408 of the first embodiment.

The output of the adder 512 is outputted to the pre-filter 513 and the movement after that is omitted because it is the same as that in the first embodiment of the present invention.

Therefore, the information needed for the symbol clock recovery is more stably obtained by increasing the power of the fs/2 frequency band signal component in an environment of existing a ghost in the second embodiment of the present invention.

When the timing edge is largely damaged in the environment of the ghost, efficiency of the symbol clock recovery is largely increased from largely increasing the power of the signal in the fs/2 frequency portion obtaining the timing information.

The present invention is applicable to all ATSC type of ground wave digital broadcasting receiver employed for the VSB conversion.

According to the symbol clock recovery of the digital TV receiver of the present invention, the edge characteristic of the signal is employed for the symbol clock recovery by converting the real/imaginary signals into the OQAM real/imaginary signals and squaring the output, the self-noise generated in the data is reduced by removing the data except the band edge component employed for the symbol clock recovery, and the jitter characteristic is enhanced.

And, the efficiency of the symbol clock recovery is increased by increasing the power of the signal of fs/2 frequency portion for obtaining the timing information by employing the squarer.

IN other words, even when the band edge component of the OQAM signal is damaged owing to a heavy noise (ghost) from the multi-passage on the transmitting channel, normal symbol clock recovery is performed, and thus the performance of the system is improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital TV receiver including an A/D converter, a carrier recovery, and a symbol clock recovery, wherein the symbol clock recovery comprises:
   an OQAM converter and filter for converting each of the digital base-band real/imaginary signals in a VSB type into OQAM real/imaginary component signals, and performing a high pass-band filtering on the OQAM real/imaginary component signals for removing information of data section;
   a squaring operator for squaring each of the OQAM real/imaginary component signals outputted from the OQAM converter and filter, and adding and outputting the calculation;
   a squarer for squaring the signal outputted from the squaring operator, and outputting the calculation for detecting timing error information; and
   a timing error detector and recovery for detecting timing error information from the squared signal outputted from the squarer, and generating and outputting at least two times the frequency of the symbol clock corrected from the detected timing error information.

2. The digital TV receiver of claim 1, wherein the A/D converter converts the analog pass-band signal transmitted in a VSB modulation type into a pass-band signal by sampling the analog signal at a fixed frequency generated from the fixed oscillator or at least two times the frequency of the symbol clock.

3. The digital TV receiver of claim 1, wherein the carrier recovery multiplies the digital pass-band signal by a standard carrier signal generated through the carrier recovery process for converting the signal into the digital base-band signal.

4. The digital TV receiver of claim 1, wherein the timing error detector and recovery comprises:
   a pre-filter for passing only a frequency of a predetermined band from the output of the squarer for recovering the symbol clock;
   a timing error detector for detecting timing error information from the output of the pre-filter;

a filter for filtering only a low pass-band signal from the timing error information outputted from the timing error detector; and an NCO for generating at least two times the frequency of the symbol clock interpolated according to low pass-band components of thefiltered timing error information.

5. The digital TV receiver of claim 4, wherein the pre-filter filters frequency near half of the frequency of the symbol clock from the ouput of the squarer.

6. The digital TV receiver of claim 1, wherein the OQAM converter and filter complex multiplies the VSB digital base-band real/imaginary component signals by the oscillating frequency with a center frequency of 2.690559 MHz for converting the VSB digital base-band real/imaginary component signals into the OQAM real/imaginary component signals.

7. The digital TV receiver of claim 1, wherein the symbol clock recovery further comprises: a multiplying operator for multiplying each of the OQAM real/imaginary component signals outputted from the OQAM converter and filter by each other, and multiplying the result by a predetermined constant, and squaring and outputting the calculation; and an adder for adding the two outputs from the squaring operator and the multiplying operator, and outputting the calculation to the timing error detector and recovery, wherein the squaring operator squares each of the OQAM real/imaginary component signals outputted from the OQAM converter and filter, and outputs the difference between the two squared signals.

8. A digital TV receiver including an A/D converter, a carrier recovery, and a symbol clock recovery, wherein the symbol clock recovery comprises: an OQAM converter and filter for converting each of the digital base-band real/imaginary signals in a VSB type into OQAM real/imaginary component signals, and performing a high pass-band filtering on the OQAM real/imaginary component signals for removing information of data section; a squaring operator for squaring each of the OQAM real/imaginary component signals outputted from the OQAM converter and filter, and outputting the difference between the two squared signals; a squarer for squaring the signal outputted from the squaring operator, and outputting the calculation; a multiplying operator for multiplying each of the OQAM real/imaginary component signals outputted from the OQAM converter and filter by each other, and multiplying the result by a predetermined constant, and squaring and outputting the calculation; an adder for adding the two outputs of the squarer and the multiplying operator, and outputting the calculation for detecting timing error information; a timing error detector and recovery for detecting timing error information from the signal outputted from the adder, and generating and outputting at least two times the frequency of the symbol clock corrected from the detected timing error information.

9. The digital TV receiver of claim 8, wherein the A/D converter converts the analog pass-band signal transmitted in a VSB modulation type into a pass-band signal by sampling the analog signal at a fixed frequency generated from the fixed oscillator or at least two times the frequency of the symbol clock.

10. The digital TV receiver of claim 8, wherein the carrier recovery multiplies the digital pass-band signal by a standard carrier signal generated through the carrier recovery process from converting the singal into the digital base-band signal.

11. The digital TV receiver of claim 8, wherein the OQAM converter complex multiplies the VSB digital base-band real/imaginary component signals by the oscillating frequency with a center frequency of 2.690559 MHz for converting the VSB digital base-band real/imaginary component signals into the OQAM real/imaginary component signals.

12. The digital TV receiver of claim 8, wherein the timing error detector and recovery comprises:

a pre-filter for passing only a frequency of a predetermined band form the output of the adder for recovering the symbol clock;

a timing error detector for detecting timing error information from the output of the pre-filter;

a filter for filtering only a low pass-band signal from the timing error information outputted from the timing detector; and an NCO for generating at elast two times the frequency of the symbol clock interpolated according to low pass-band components of the filtered timing error information.

13. The digital TV receiver of claim 12, wherein the pre-filter filters frequency near half of the frequency of the symbol clock from the output of the squarer.

* * * * *